United States Patent
Tokushige et al.

(10) Patent No.: US 7,334,417 B2
(45) Date of Patent: Feb. 26, 2008

(54) AIR CONDITIONER AND POWER LINE COMMUNICATION SYSTEM

(75) Inventors: Koichi Tokushige, Shizuoka (JP); Yasuyuki Kojima, Hitachi (JP); Tatsumi Yamauchi, Hitachiota (JP); Makoto Ito, Shizuoka (JP); Noriyuki Bunko, Shizuoka (JP)

(73) Assignee: Hitachi Appliances, Inc., Tokyo (JP)

( * ) Notice: Subject to any disclaimer, the term of this patent is extended or adjusted under 35 U.S.C. 154(b) by 452 days.

(21) Appl. No.: 11/033,633

(22) Filed: Jan. 13, 2005

(65) Prior Publication Data

US 2005/0188706 A1 Sep. 1, 2005

(30) Foreign Application Priority Data

Jan. 15, 2004 (JP) ............................. 2004-007441

(51) Int. Cl.
*F25B 7/00* (2006.01)
*H04B 1/00* (2006.01)
(52) U.S. Cl. ........................... 62/175; 236/51; 375/130
(58) Field of Classification Search ................. 62/175; 236/51; 375/130, 132, 147, 135, 136, 131, 375/141, 143
See application file for complete search history.

(56) References Cited

U.S. PATENT DOCUMENTS

| 4,641,322 A * | 2/1987 | Hasegawa ................... 375/145 |
| 6,466,607 B1 * | 10/2002 | Chauncey et al. .......... 375/131 |
| 2001/0050944 A1 * | 12/2001 | Takata et al. ............... 375/130 |
| 2005/0217293 A1 * | 10/2005 | Lee et al. ..................... 62/207 |

FOREIGN PATENT DOCUMENTS

| JP | 63-107248 | 5/1988 |
| JP | 07-245576 | 9/1995 |
| JP | 2001-345742 | 12/2001 |
| JP | 2003-262387 | 9/2003 |

* cited by examiner

*Primary Examiner*—Marc Norman
(74) *Attorney, Agent, or Firm*—Antonelli, Terry, Stout & Kraus, LLP.

(57) ABSTRACT

An air conditioner and a power line communication system high in reliability and free of malfunction facilitates the installation work such as the wiring. The air conditioner for conducting communication through a power line includes a bridge unit connected to at least an outdoor unit through a transmission line, and at least an indoor unit connected from the power line through a blocking filter. A side of the bridge unit far from the outdoor unit is connected between the blocking filter and the indoor unit. The bridge unit subjects a signal from the outdoor unit to spread spectrum modulation and transmits it by superposing the resulting signal on the power line. The superposed signal is received and demodulated by the indoor unit.

9 Claims, 5 Drawing Sheets

AIR CONDITIONER AND POWER LINE COMMUNICATION SYSTEM

BACKGROUND OF THE INVENTION

This invention relates to an air conditioner for conducting data communication mainly with a power line as a communication medium, or in particular to an air conditioner suitably used for controlling the air condition over a plurality of divided areas in a building or the like while at the same time conducting the centralized control and management of equipment and devices.

A conventional air conditioner is known which conducts communication through a power line between an indoor unit and an outdoor unit to reduce the number of wirings. In the centralized control and management of the housing equipment and devices, the power line carrier communication is conducted, and to prevent signal leakage and interference, the impedance is balanced and a high-pass filter arranged between two power lines in a power line communication area (see JP-A-7-245576).

In the conventional air conditioner comprising an outdoor unit and a multiplicity of indoor units, the indoor units are installed in a plurality of areas into which a building or the like is divided in accordance with the layout of rooms. The indoor units exchange the operating information (start/stop, operation mode, set temperature, set air flow rate, the temperature and pressure of the essential parts of the refrigeration cycle) with each other as control information and a comparatively large amount of power is consumed. Therefore, it is difficult to reduce the leakage signal which deteriorates the effective transmission rate. In the case where the open signal of the expansion valve transmitted from the outdoor unit to the indoor units is delayed, for example, the refrigeration cycle may not be normally controlled.

BRIEF SUMMARY OF THE INVENTION

An object of this invention is to solve the above-mentioned problem and provide an air conditioner and a power line communication system reliable and free of malfunction, in which the wiring work is easily conducted in any scale of the system.

Another object of the invention is to provide a power line communication system for conducting a reliable power line communication easily without any special device.

Still another object of this invention is to improve the workability and facilitate the renewal without adversely affecting the system design freedom.

In order to achieve the above-mentioned objects, according to one aspect of this invention, there is provided an air conditioner for conducting communication between at least an outdoor unit and at least an indoor unit through a power line, comprising a bridge unit connected to the outdoor unit through a transmission line and the indoor unit connected through a blocking filter from the power line, wherein the side of the bridge unit far from the outdoor unit is connected between the blocking filter and the indoor unit, and wherein the bridge unit transmits the signal from the outdoor unit in supervision on the power line by spread spectrum modulation, and the superposed signal is received and demodulated by the indoor unit.

In the air conditioner described above, a noise generator for applying a noise is preferably inserted between the blocking filter and the indoor unit.

Further, in the air conditioner described above, a plurality of indoor units are divided into groups, each preferably including a bridge unit and a blocking filter.

Furthermore, in the air conditioner described above, a plurality of indoor units are divided into groups, each including a bridge unit and a blocking filter. At the same time, a noise larger than the leakage signal between the group areas is preferably applied between the blocking filter and the indoor units.

In addition, in the air conditioner described above, a plurality of indoor units are divided into groups, each including a bridge unit and a blocking filter. At the same time, a white noise is preferably applied between the blocking filter and the indoor units.

Furthermore, in the system described above, a plurality of indoor units are divided into groups, and the bridge unit and the blocking filter are provided for each group area. At the same time, a noise generator for applying a white noise in a plurality of stages of magnitude is preferably inserted between the blocking filter and the indoor unit.

What is more, in the system described above, a noise generator for applying a noise is preferably inserted between the blocking filter and the indoor unit. The noise generator has the function of measuring the floor noise of the power line and the function of determining the noise applied as related to the measurement.

According to another aspect of the invention, there is provided a power line communication system comprising an air conditioner for conducting communication through a power line between an outdoor unit and an indoor unit, an illumination unit and a ventilator, the power line communication area being divided into groups, each group including a blocking filter arranged midway of the power line in such a manner that the secondary side constitutes the communication area, a bridge unit connected to the secondary side of the communication area from the outdoor unit through a transmission line, and a noise generator for applying a noise larger than the leakage signal between the communication areas to the secondary side of the communication area, wherein the bridge unit modulates by spread spectrum the signal from the outdoor unit and transmits the resulting signal in superposed form to the secondary side of the communication area, the superposed signal being received and demodulated by the indoor unit, the illumination unit or the ventilator.

In addition, in the system described above, the noise generator has the function of measuring the floor noise of the power line and determining the magnitude of the noise applied as related to the measured value.

According to still another aspect of the invention, there is provided a power line communication system for conducting communication between a transmitting unit and a receiving unit through a power line, the power line communication area being divided into groups, each including a blocking filter arranged midway of the power line in such a manner that the communication area is on the secondary side, a bridge unit connected to the secondary side of the communication area from the transmitting unit through a transmission line, and a noise generator for applying a noise larger than the leakage signal between the communication areas to the secondary side of the communication area, and wherein the bridge unit modulates by spread spectrum the signal from the transmitting unit and transmits the signal in superposed form to the secondary side of the communication area, the superposed signal being received and demodulated by the receiving unit.

According to this invention, a reliable air conditioner free of malfunction is obtained, in which the wiring and the like installation work can be conducted easily regardless of the size of the system. Especially, a reliable power line communication system is easily implemented with an improved workability and renewal performance without adversely affecting the system design freedom including the centralized control and management of the equipment as well as the air-conditioning operation.

Other objects, features and advantages of the invention will become apparent from the following description of the embodiments of the invention taken in conjunction with the accompanying drawings.

DETAILED DESCRIPTION OF THE INVENTION

Figure 1:
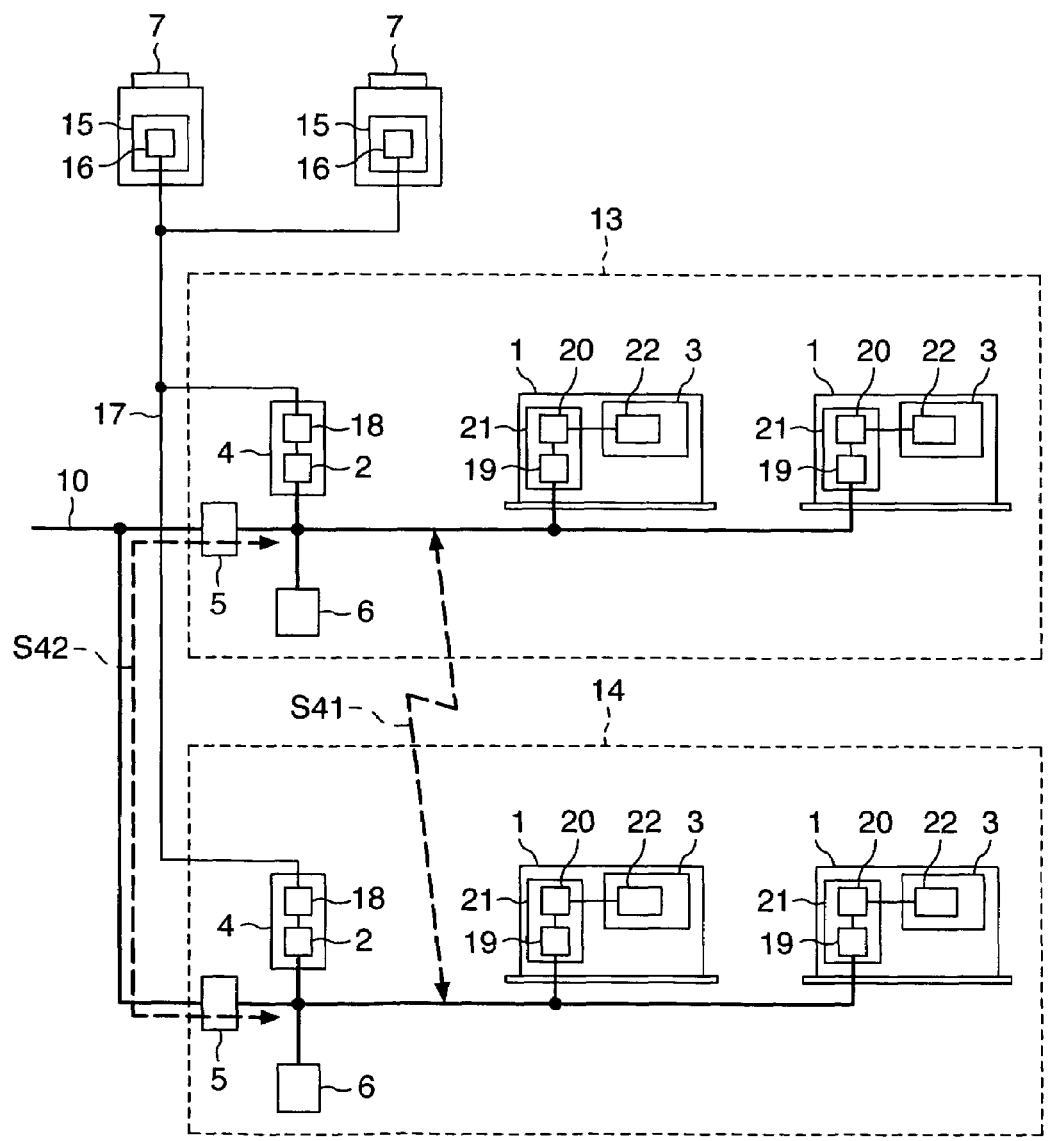
FIG. 1 is a block diagram showing an air-conditioner according to an embodiment of the invention.

In the air-conditioning system, the indoor units 1 are arranged in a plurality of areas defined in accordance with the room layout, and each defined area includes a bridge unit 4, through which communication is conducted with the outdoor units 7 through a power line. The bridge unit 4 and the indoor units 1 include power line communication modems 2 and 19 using the spread spectrum communication.

The bridge units 4 are arranged in each of the divided areas. Even under different control conditions for different rooms, therefore, the total communication throughput can be improved by separating the transmission path. In the spread spectrum communication system, a minuscule spectrum is spread over a wide frequency band. The divided areas are mutually liable to be affected by the leakage signals. Also, in the transmission path access method of CSMA/CD or CSMA/CA, the transmission from other communications units is detected by the carrier signal. In the conventional communication devices such as the baseband modem or the modem used for the telephone line, the carrier is detected by determining the relative strength of the input signal and a reference spread signal. In the communication unit using the spread spectrum method, however, the carrier signal is detected by determining the relative strength of the input signal and a reference spread signal. Therefore, the method of carrier detection as described in JP-A-7-245576 is not sufficient. Embodiments of this invention are described in detail below.

Embodiment 1

FIG. 1 shows an air conditioner comprising a plurality of indoor units 1, a plurality of outdoor units 7, and a refrigeration cycle (not shown) for recirculating the refrigerant between the indoor units 1 and the outdoor units 7. The outdoor units 7 each include an outdoor controller 15 for controlling the devices such as a compressor or a fan for blowing the air to an outdoor heat exchanger to drive the outdoor units 7. The outdoor controller 15 is supplied with the operation data such as the temperature of the outdoor heat exchanger, the refrigerant pressure, the atmospheric temperature and the rotational speed of the compressor. Based on these data of the outdoor units 7 and the data transmitted from the indoor controllers 3 of the indoor units 1, the outdoor units 7, i.e. the refrigeration cycle is controlled.

Each indoor unit 1 includes an indoor controller 3 for controlling the devices such as a fan for blowing the air to the indoor heat exchanger to control the indoor unit 1. Each indoor controller 3 controls the corresponding indoor unit 1 based on the data such as the temperature of the indoor heat exchanger and the set temperature input from a remote controller to the indoor unit 1 and the data transmitted from the outdoor controller 15.

Specifically, the indoor units and the outdoor units exchange the operation information (intake pressure, discharge pressure, compressor temperature, outdoor unit expansion valve opening, indoor unit expansion valve opening, compressor current, compressor frequency, atmospheric temperature, evaporation temperature, suction temperature, blowout temperature, gas pipe temperature, liquid pipe temperature and set temperature) with each other. In other words, data communication is conducted between the outdoor controller 15 and the indoor controller 3 thereby to control the various devices.

In signal transmission from the outdoor controller 15, the communication data outputted from the microcomputer in the outdoor controller 15 is converted into a signal pulse by the communication circuit 16 of the outdoor controller 15, and inputted to the bridge unit 4 through a transmission line 17. The bridge unit 4 includes the communication circuit 18, which converts the signal pulse to the communication data. In the power line communication unit 2 in the bridge unit 4, the spread spectrum modulation is conducted. Specifically, the signal data is multiplied by a pseudo-random number sequence having a certain bandwidth by the direct spread system, so that the frequency band of the data string is widened and modulated, and then transmitted in superposition on the power line 10 for the indoor units 1.

The power line communication unit 19 in the adaptor 21 of each indoor unit 1 receives the spread spectrum modulation signal superposed on the power line, and by demodulation, converts it to the communication data. This communication data is converted into a signal pulse and inputted to the indoor controller 3. The communication circuit 22 in the indoor controller 3 converts the signal pulse into the communication data, which is received by the microcomputer in the indoor controller 3.

In signal transmission from each indoor controller 3, on the other hand, the communication data outputted from the microcomputer of the indoor controller 3 is converted into a signal pulse by the communication circuit 22 and inputted to the adaptor 21. The communication circuit 20 converts the pulse signal to the communication data, which is subjected to the spread spectrum modulation by the power line communication unit 19 and superposed on the indoor unit power line 10. The spread spectrum modulation signal superposed on the power line 10 is received and demodulated by the power line-communication unit 2 into the communication data. The communication data thus converted is converted into a pulse signal by the communication circuit 18, and inputted to the outdoor controller 15 through the transmission line 17. Next, the signal pulse is converted into the communication data by the communication circuit 16, and received by the microcomputer in the outdoor controller 15.

A blocking filter 5 is arranged midway of the power line 10 connected to the indoor units 1. The blocking filter 5 functions to attenuate the primary noise on the one hand and prevents the spread spectrum modulation signal superposed on the power line from leaking to the primary side. As a result, the secondary side of the blocking filter 5 is used exclusively for the power line communication for an improved operating convenience.

Next, the signal superposed on the secondary power line 10 of the blocking filter 5 is described with reference to FIG. 2.

Figure 2:
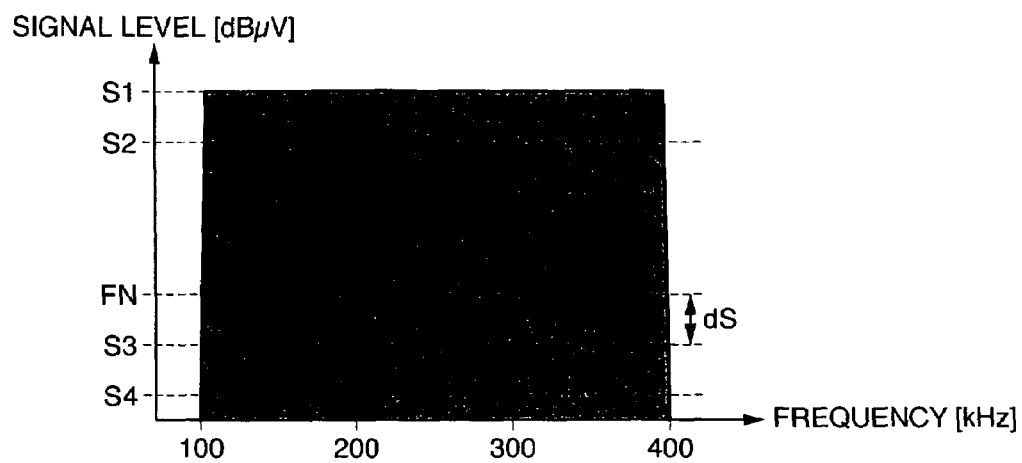
FIG. 2 is a graph showing the relation between the level and frequency of the signal superposed on the power line according to an embodiment of the invention.

The transmission output of the power line communication units 2, 19 is designated by S1 in FIG. 2. At the receiving end, on the other hand, the signal level is reduced to S2 due to the attenuation of the power line 10 and the deterioration caused by signal reflection. Also, assume that the floor noise generated by the power line 10 is FN and the lower receivable level limit S3 of the power line communication units 2, 19 is given as FN-dS.

Further, assume that the spread spectrum modulation signal transmitted over the power line 10 from other power line communication areas is S42, the spread spectrum modulation signal leaked by the magnetic coupling or the capacitive coupling between the power lines 10 in the power line communication areas 13, 14 is S41, and the total thereof S4. As long as S3 is larger than S4, the signals of other power line communication areas are not received.

Figure 3:
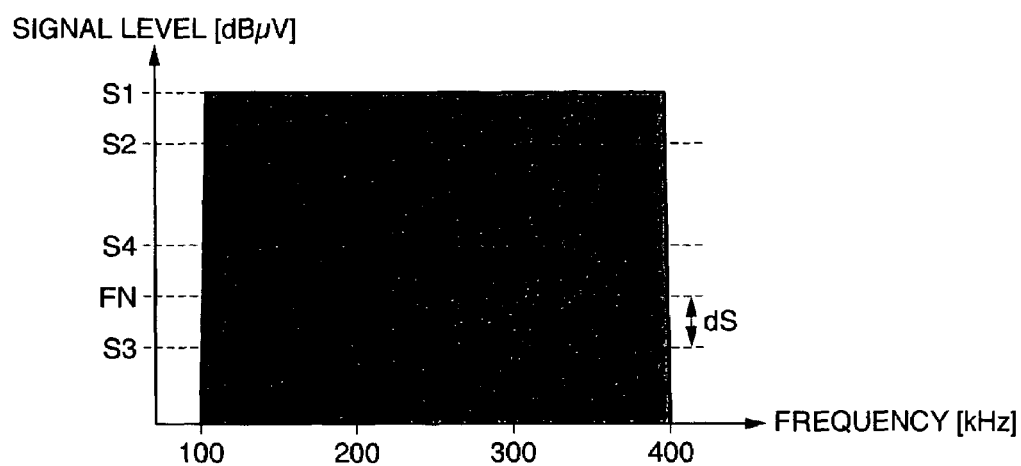
FIG. 3 shows the relation between the level and frequency of the signal superposed on the power line.
Figure 4:
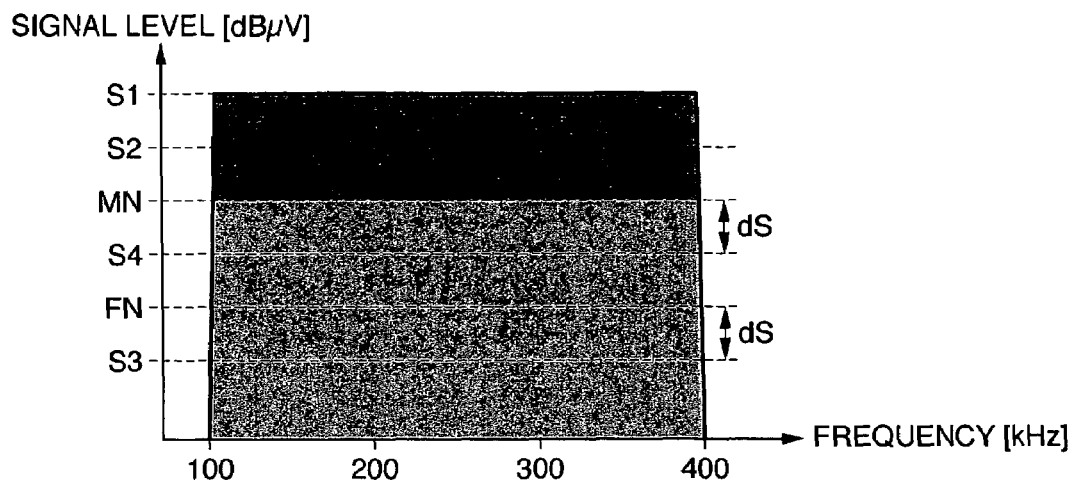
FIG. 4 shows the relation between the level and frequency of the signal superposed on the power line.

In the case where the relation between the lower receivable level limit S3 of the power line communication units 2, 19 and the leakage signal S4 is S3<D4 as shown in FIG. 3, on the other hand, the signals are received undesirably from other power line communication areas. To obviate this problem, as shown in FIG. 4, a noise MN higher than the leakage signal S4 by at least dS is applied to the power line 10. Then, the leakage signal S4 from the other power line communication areas is not received. Also, by reducing the noise MN to a value lower than the receiving end signal level S2, no effect is had on the normal communication in the power line communication areas.

Next, the noise generator 6 for applying a noise to the power line 10 described above is described in detail.

Figure 5:
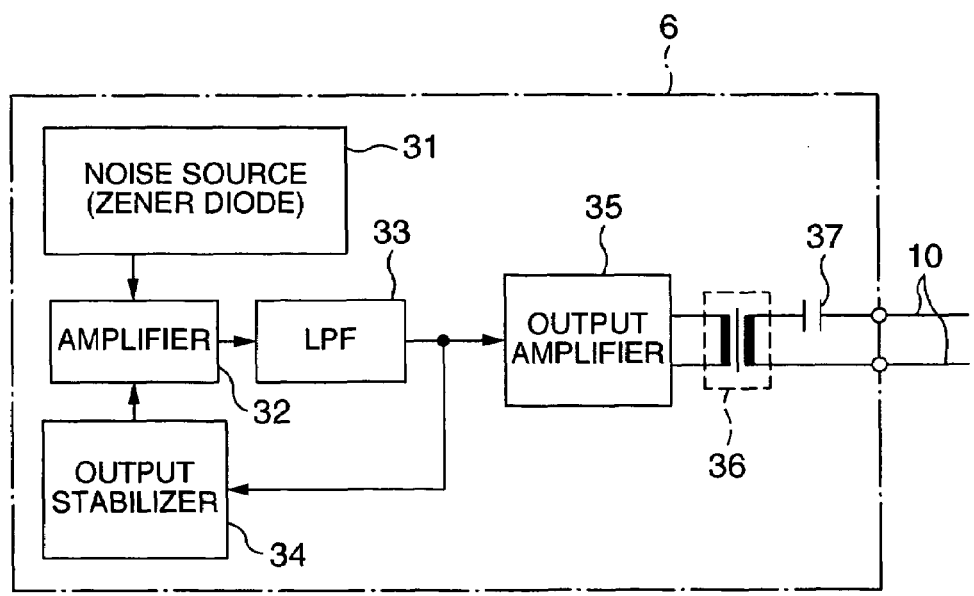
FIG. 5 is a block diagram showing a noise generator according to an embodiment of the invention.

In FIG. 5, a Zener diode which is inexpensive and easy to acquire is used as a noise source 6. The Zener diode is known to generate a white noise before entering the Zener operation with a small forward current. The small white level noise is amplified by an amplifier 32. Also, in view of the fact that the spread spectrum frequency is set to 100 to 400 kHz as shown in FIG. 2, a LPF 33 for cutting off the components of higher than 400 kHz is attached to reduce the unrequited spurious signals.

Further, the magnitude of the white noise generated by the Zener diode 33 constituting a noise source undergoes so great a change that an output stabilization circuit 34 is added. The signal with the spurious component thereof reduced by the LPF 33 is further amplified by the output amplifier circuit 35, and connected to the indoor unit power line 10 by an insulating transformer 36. Also, a capacitor 37 is added between the power line 10 and the insulating transformer 36 to superpose only the high-frequency component on the power line 10.

Each indoor unit 1 or the bridge unit 4 has the function to suspend the transmission. As a result, the communication amount of the power line 10 for power line communication can be reduced. Even in the case where a multiplicity of indoor units 1 are connected, therefore, the minimum communication required for controlling the air conditioner can be conducted in stable fashion.

Embodiment 2

A case is described in which the magnitude of the noise generated by the noise generator 6 shown in FIG. 5 can be changed.

Figure 6:
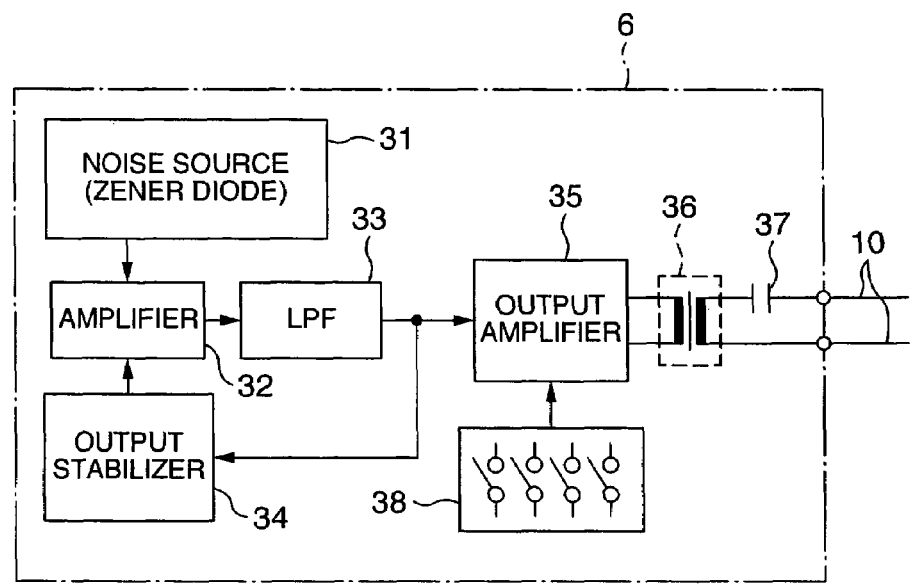
FIG. 6 is a block diagram showing a noise generator according to another embodiment of the invention.

In FIG. 6, a group of 4-bit switches 38, for example, are manually adapted to be set so that the amplitude degree of the output amplifier circuit 35 can be changed in any of 16 ways. As a result, after installing and wiring the air conditioner and the actually transmitting the signal between the indoor units 1 and the outdoor units 7, the magnitude of the noise applied to the power line 10 can be determined. Thus, the signal can be accurately transmitted for a higher reliability.

Embodiment 3

Next, a case is described in which the magnitude of the noise applied to the power line 10 can be automatically changed.

Figure 7:
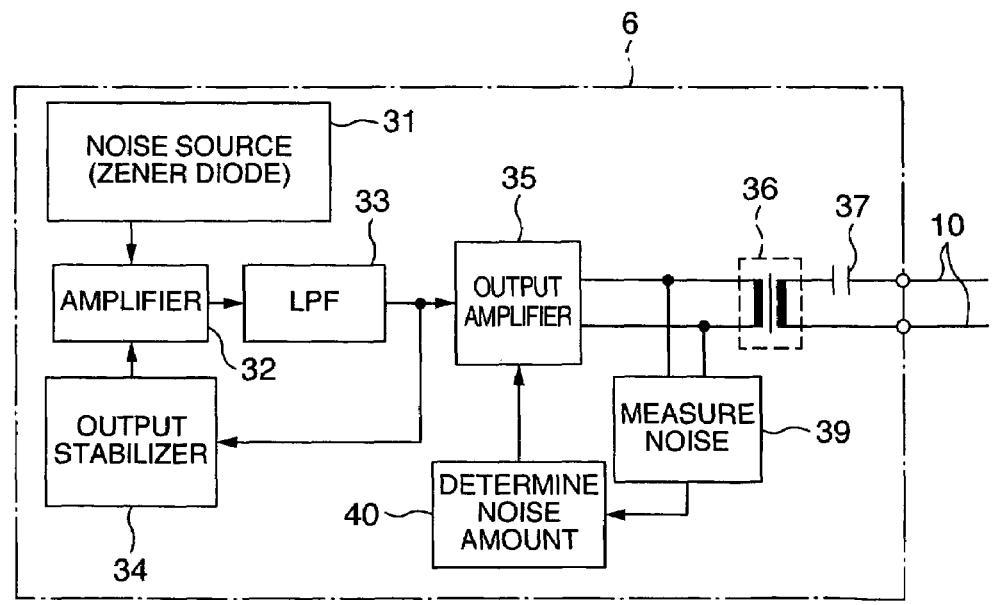
FIG. 7 is a block diagram showing a noise generator according to still another embodiment of the invention.

In FIG. 7, a noise measuring circuit 39 measures the magnitude of the noise of the power line 10 before generation of the noise from the noise generator 6. In accordance with the magnitude of the noise, a noise amount determining circuit determines the magnitude of the noise and in accordance with the magnitude of the noise thus determined, changes the amplitude degree of an output amplifier circuit 35.

Specifically, before applying a noise, the floor noise of the power line 10 is passed through an insulating transformer 36 and a bandpass filter, so that only the signal in the spread spectrum frequency band is extracted and measured. The floor noise is small in level and therefore amplified by an amplifier circuit. Also, the floor noise, which is an AC signal, is converted into a DC voltage by an AC-DC converter circuit and inputted to an A/D converter circuit of the microcomputer. The microcomputer performs the arithmetic operation to output a noise 1.2 times as large as the floor noise thereby to determine the amplitude degree of the output amplifier circuit 35.

As a result, the magnitude of the noise applied to the power line is optimally determined in accordance with the actual wiring conditions of the air conditioner and the conditions of the air conditioner. Thus, the signal can be accurately transmitted between the indoor units 1 and the outdoor units 7 for an improved reliability of the refrigeration cycle.

Embodiment 4

An example in which such equipment as the illumination unit and the ventilator as well as the air conditioner can be controlled by power line communication is described with reference to FIG. 8.

Figure 8:
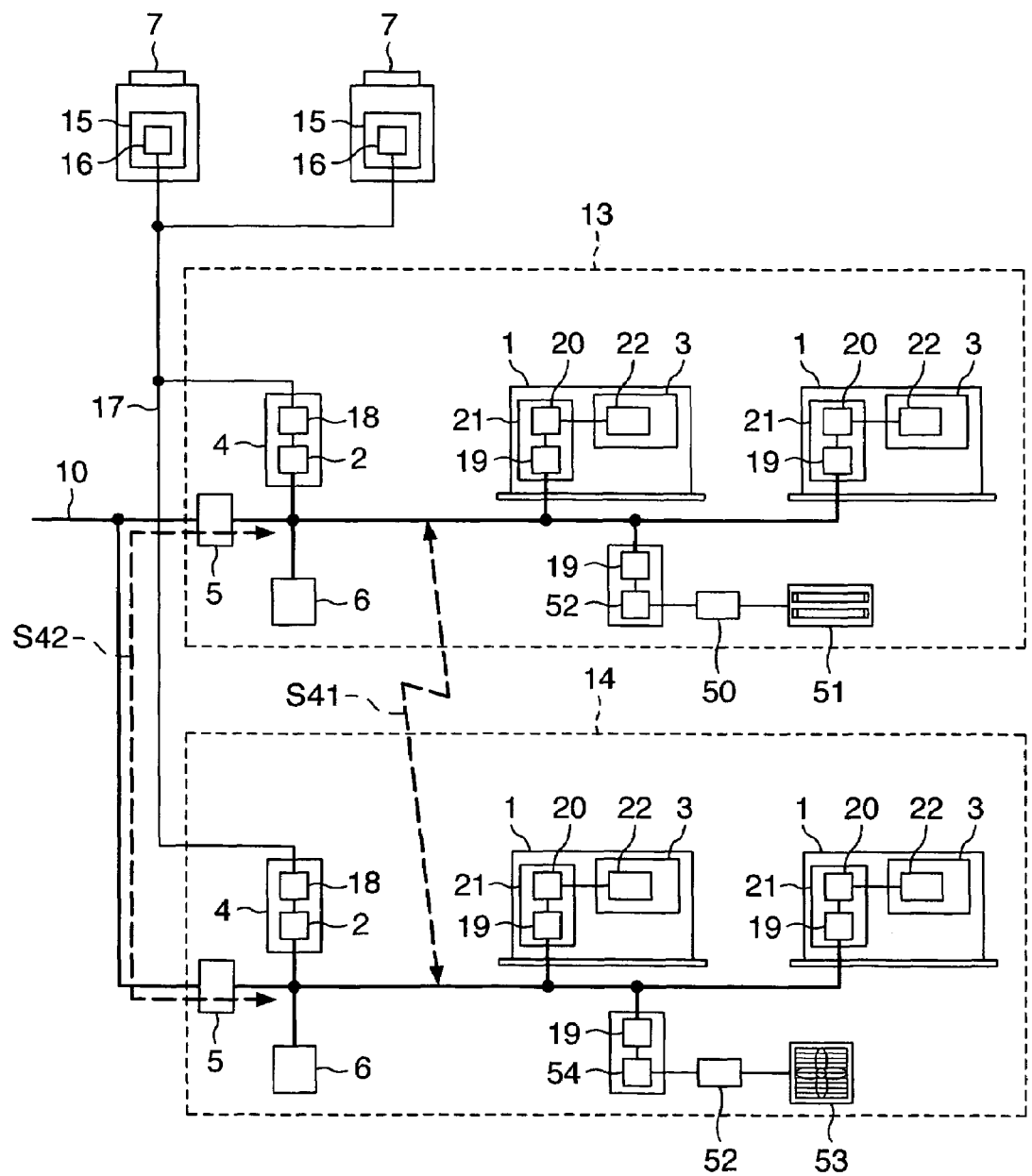
FIG. 8 is a block diagram showing an air-conditioning system according to another embodiment of the invention.

In FIG. 8, the illumination controller 50 is connected to the power line 10 through the power line communication unit 19 and the communication unit 52 thereby to communicate with the indoor unit controller 3. As a result, the interlocked control operation is made possible between each indoor unit 1 and the illumination unit 51 controlled by the illumination controller 50. Also, the ventilation controller 52 is connected to the power line 10 through the power line communication unit 19 and the communication unit 54 to communicate with the indoor unit controller 3. As a result, the interlocked control operation is made possible between each indoor unit 1 and the ventilator 53 controlled by the ventilation controller 52. A similar interlocked control operation is made possible also for other equipment than the illumination unit and the ventilator by power line communication.

As described above, in order to minimize the receipt of the spread spectrum modulation signal S42 leaking from the other power line communication areas 13, a noise larger than the signal leaking into a power line communication area 13 and smaller than the signal in the particular power line communication area 13 is applied. Therefore, the leaking spread spectrum modulation signal S42 is not received by the indoor unit 6 or the bridge 4, and the normal signal communication is made possible.

As an alternative, the noise of the power line 10 is measured, and the threshold for determining the output of the correlator in the communication unit is adjusted in accordance with the magnitude of the noise. In this way, the leakage signal from other power line communication areas is prevented from being received without applying a noise to the power line.

In the case where the communication data mounted on the power line exceeds a predetermined level, on the other hand, the increase is considered due to the spread spectrum modulation signal S42 from other areas 13, and the noise output of the noise generator 6 is increased to the upper limit.

Further, as long as only the leaking spread spectrum modulation signal S42 is electrically masked, the indoor unit 6 and the bridge 4 can perform normal signal communication and the malfunction can be eliminated.

Furthermore, the magnitude of the noise applied to the power line 10 is changed manually in arbitrary fashion in accordance with the magnitude of the spread spectrum modulation signal S42 leaking from the other areas 13 where the air conditioner is installed. In this way, the level of the noise applied to the power line 10 required for electrical masking can be reduced to the required minimum. Thus, the unrequited radiation (spurious signal) of the applied noise can be suppressed.

Further, by measuring the power line noise and determining the magnitude of the noise applied in accordance with the power line noise, the level of the noise applied to the power line 10 for electrically masking the magnitude of the spread spectrum modulation signal S42 leaking from the other areas 13 where the air conditioner is installed can be automatically reduced to the required minimum. Thus, the system can be maintained effectively even when the power line noise undergoes a change during the communication at the place of installation.

Furthermore, by measuring the noise of the power line 10 and adjusting the threshold for determining the output of the correlator in the communication unit in accordance with the magnitude of the noise, the magnitude of the noise applied to the power line 10 can be determined by the threshold.

Thus, the receipt of the spread spectrum modulation signal S42 leaking from the other power line communication areas 13 is prevented without applying the noise to the power line 10.

In addition, since the communication amount of the air conditioner is statistically substantially constant, the noise due to the spread spectrum modulation signal S42 from other areas 13 is determined without any special noise measuring unit. By thus increasing the noise output of the noise generator 6 up to the requirement upper limit, stable communication can be effected.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An air conditioner for conducting communication between at least an outdoor unit and at least an indoor unit through a power line, comprising:
    a bridge unit connected to said outdoor unit through a transmission line; and
    the indoor unit connected from the power line through a blocking filter;
    wherein a side of the bridge unit far from the outdoor unit is connected between the blocking filter and said indoor unit;
    wherein the bridge unit subjects a signal from the outdoor unit to spread spectrum modulation and transmits the modulated signal to the indoor unit by superposing the modulated signal on the power line, and the indoor unit receives and demodulates the superposed signal.

2. An air conditioner according to claim 1,
    wherein a noise generator for applying a noise is connected between said blocking filter and said indoor unit.

3. An air conditioner according to claim 1,
    wherein a plurality of indoor units are divided into groups each including said bridge unit and said blocking filter.

4. An air conditioner according to claim 1,
    wherein a plurality of indoor units are divided into group areas each including said bridge unit and said blocking filter, and a noise larger than a leakage signal between the areas is applied between the blocking filter and the indoor unit.

5. An air conditioner according to claim 1,
    wherein a plurality of indoor units are divided into group areas each including the bridge unit and the blocking filter, and a white noise is applied between the blocking filter and the indoor unit.

6. An air conditioner according to claim 1,
    wherein a plurality of indoor units are divided into group areas each including the bridge unit and the blocking filter, and a white noise generator for generating a white noise in a plurality of magnitude levels is connected between the blocking filter and the indoor unit.

7. An air conditioner according to claim 1,
    further comprising a noise generator for applying a noise between said blocking filter and said indoor unit,
    wherein said noise generator has the function of measuring a floor noise of the power line and the function of determining a size of the applied noise as related to a measured value.

8. A power line communication system comprising an air conditioner for conducting communication between at least an outdoor unit and at least an indoor unit, an illumination unit and a ventilator, the system conducting communication through a power line with a communication area thereof divided into a plurality of groups each including:

a blocking filter arranged midway of the power line in such a manner that a secondary side of the blocking filter constitutes the communication area of the power line;

a bridge unit connected to a secondary side of the communication area through a transmission line from the outdoor unit; and a noise generator for applying, to the secondary side of the communication area, a noise larger than a leakage signal between the communication areas;

wherein the bridge unit subjects a signal from the outdoor unit to a spread spectrum modulation and transmits by superposing the signal to the secondary side of the communication area, the superposed signal being received and demodulated by selected one of the indoor unit, the illumination unit and the ventilator.

9. A power line communication system according to claim 8, wherein said noise generator has the function of measuring a floor noise of the power line and the function of determining a magnitude of the noise applied as related to a measured value.

* * * * *